(12) United States Patent
Hares et al.

(10) Patent No.: US 7,856,001 B2
(45) Date of Patent: Dec. 21, 2010

(54) WIRELESS MESH ROUTING PROTOCOL UTILIZING HYBRID LINK STATE ALGORITHMS

(75) Inventors: Susan K. Hares, Saline, MI (US); Nehru Bhandaru, Sudbury, MA (US)

(73) Assignee: U4EA Wireless, Inc., Menlo Park, CA (US)

( * ) Notice: Subject to any disclaimer, the term of this patent is extended or adjusted under 35 U.S.C. 154(b) by 1043 days.

(21) Appl. No.: 11/455,078

(22) Filed: Jun. 15, 2006

(65) Prior Publication Data

US 2006/0285529 A1 Dec. 21, 2006

Related U.S. Application Data

(60) Provisional application No. 60/691,091, filed on Jun. 15, 2005.

(51) Int. Cl.
*H04W 4/00* (2009.01)

(52) U.S. Cl. .............. 370/338; 370/355; 370/356; 379/219; 379/220.01

(58) Field of Classification Search ............. 370/338, 370/355, 356; 379/219, 220.01
See application file for complete search history.

(56) References Cited

U.S. PATENT DOCUMENTS 7,280,519 B1 * 10/2007 Shane ................. 370/338

* cited by examiner

*Primary Examiner*—Nghi H Ly
*Assistant Examiner*—Amancio Gonzalez
(74) *Attorney, Agent, or Firm*—Perkins Coie LLP

(57) ABSTRACT

Systems and methods are described for exchanging and determining routes in packet-switched mesh networks. Nodes in the mesh networks may be coupled via wireless and fixed-wire links. Routing protocols used to determine routes include link state protocols and hybrids of link state and path vector protocols. Type-Length-Value formats are provided to facilitate state information for nodes in the packet switched network, allowing paths to be re-routed through the mesh networks in real-time.

8 Claims, 13 Drawing Sheets

DB Request & Update

1101

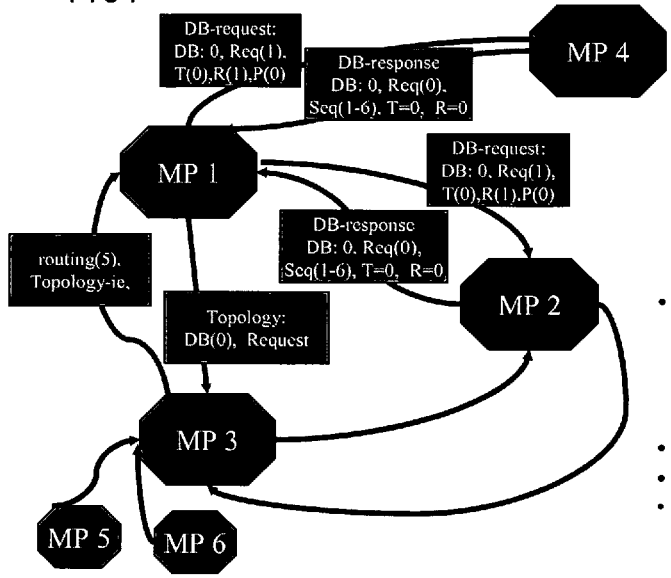

- MP2, MP3, MP4 come upon MP1
  - MP1 sends DB request to MP2
    - Flags: T(0),R(1),P(0)
    - Receives response (in green) that MP2 originates LSAs 1-4, 6
  - MP1 Sends DB request (0) to MP3
    - Flags: T(0), R(1), P(0)
    - Receives response (in green) that MP3 originates LSA 4
  - MP1 sends dB request (0) to MP4
    - Flags: T(0), R(1), P(0)
    - Receives response in green that MP4 has 1 LSA #7
- MP1
  - Requests LSA 1-3, 5 originated from MP3,
  - Requests LSA 4,6 from MP2
  - Request LSA 7 from MP4
- MP2: sends 1-3,5
- MP3: sends 4-6
- MP4: sends LSA 7

1102

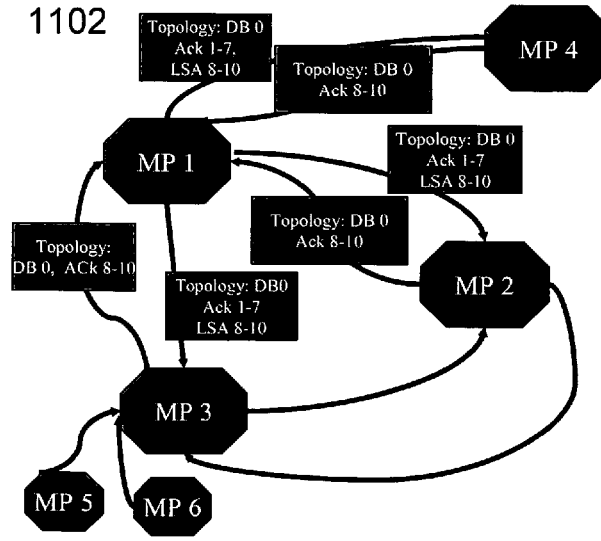

- Topology message sent out from MP1 to MP2, MP3, MP4
  - Acks LSA 1-7
  - Originates with LSAs 8-10
- MP2, MP3, MP4 send topology message
  - Ack 8-10 LSA

| 1 byte | 1 byte | 1 byte | 2 bytes | 3 bytes |
|---|---|---|---|---|
| Wi-mesh Routing Protocol ie | Control Protocol (4 bits) | Version (4 bits) | routing Pkt type | Seq # Of XMT | Routing metrics |

Optional Fields for Neighbor

| 1 byte | 2 byte |
|---|---|
| Routing Capabliity ie | MP Capability Flags (2 bytes) – types of element ids |

| 1 byte | 4 bytes | 4 bytes |
|---|---|---|
| Hello Timers ie | Hello interval | Router Dead interval |

| 1 byte | 2 byte | 2 bytes | 1 byte | 1 byte |
|---|---|---|---|---|
| Traffic Engineering metric | Constraint map | Node weight | Link Weight | Forwarding Element ie | Forwarding Flags |

| 1 byte | 2 byte | 1 byte |
|---|---|---|
| Neighbor's Neighbor Link ie | Total length | Count of neighbors of Neighbor |

| 6 bytes | 2 bytes | 1 byte | 1 byte | 6 bytes |
|---|---|---|---|---|
| MP Neighbor ID | Last Seq # of Hello | Radio Aware metric | Topology Hop metric | MLID | Cnt of Unicast MAC |

| 6 bytes | 2 bytes | 1 byte | 1 byte | 6 bytes |
|---|---|---|---|---|
| MP Neighbor ID | Last Seq # of Hello | Radio Aware metric | Topology Hop metric | MLID |

| 1 byte | 1 byte | 6 bytes | 6 bytes | 6 bytes |
|---|---|---|---|---|
| Unicast MAC ie | count | Unicast MAC | Unicast MAC | Unicast MAC |

| 1 byte | 1 byte | 6 bytes | 1 byte | 6 bytes | 1 byte |
|---|---|---|---|---|---|
| Group (Multicast) MAC ie | count | Group MAC1 | Group MAC1 Flag | Group MACn | Group MACn Flag |

Figure 12

Ack Functionality – Neighbor ie

WIRELESS MESH ROUTING PROTOCOL UTILIZING HYBRID LINK STATE ALGORITHMS

CLAIM OF PRIORITY

This application claims priority to U.S. Provisional Application 60/691,091, filed Jun. 15, 2005, inventor Susan Hares, entitled "Wireless Routing and Security of 802.11 Frames Using Hybrid Routing Algorithms and Secure Multicast Keys", which is hereby incorporated by reference in its entirety.

FIELD OF THE INVENTION

This invention related to the field of computer networking, and more specifically to the protocols for fixed-line and wireless networking.

BACKGROUND

The rate at which wireless networks are being deployed is accelerating along with their size and ubiquity. While enterprises, carriers, government and municipalities rush to deploy wireless networks, evolving technological standards, and inadequacies in current wireless products (such as lack of flexibility, scalability, and mobility features) render challenges in the deployment of wireless networks.

Wireless networks based on 802.11/WiFi and 802.16/WiMax technology standards comprise a majority of current wireless deployments. Wireless access to wired networks and the Internet is provided by radio devices deployed at the edge of the network. New wireless networks are being deployed in locations where associating a wireless access point (AP) are not located near wired networks. These networks are being created from access points that interact together to form a mesh of nodes, denoted as wireless mesh.

These wireless mesh networks may be standalone or may link to a wired network at an access point. One or many wireless mesh networks may be linked together via a wireless links or via wired networks. The wireless mesh networks may be secure encrypting data between wireless access points. An Access Pointing (AP) operating as part of a mesh is denoted as a mesh point (MP). PRIOR ART FIG. 1 shows the access points 100, 101, 102, 103, 104, 105 and 106 operating as a Mesh Point. Mesh Point 104 is connected to a wired switch (107) with an Authentication Server (108) attached to it. Mesh Point 105 is connected to a wired switch (109) with a Captive portal attached to it (110).

The new wireless networks are intended to support varied applications including, as examples, security cameras, voice calls, sensors and support of traditional computing. These applications are supported over access points with a range of bandwidth with limited power resources. To support these applications, there is a need for wireless mesh nodes need to create forwarding paths based on MAC addresses that support:

Quality of Service (QoS) tuned for a particular application such as voice, video, sensor network,
802.11e forwarding for QoS paths,
Unicast data traffic,
Multicast data traffic,
Traffic loading based on bandwidth on radio link,
Power usage of a particular wireless mesh,
Resource constraints for Radio Frequency (Channel, radio, power, antenna), Power or Environment, or
Connectivity to wired network or to Authentication server, or
Multiple links to the wired network, and
Different levels of security for different paths.

Some of the applications running over a wireless network have stringent requirements end-to-end delay, network convergence time, fast fail-over to alternate paths and congestion avoidance. For example, voice requires fast fail-over time between pathways so that voice calls will not be dropped. Traditional networks may utilize pre-calculated fail-over paths for voice calls based on relatively stable network topologies. Radio interference in radio medium can cause frequent topology changes requiring either on-demand calculation of network topologies or frequent re-calculation of end-to-end fail-over paths. These features are not supported by the prior art.

There is also a need for path algorithms that allow fast network convergence times on the order of milliseconds; this is particularly critical for radio networks, especially the mesh networks. Calculating these forwarding paths can be done via a path calculation algorithm or user policy or a combination of user policy and path calculation. Path calculation algorithms include distance vector algorithms, path vector algorithms, link-state protocols, or link-state path vector algorithms. User policies aid in creating logical networks whose performance may be tuned for QoS for applications such as voice, video or data, different traffic patterns for unicast and multicast, reducing power usage in a wireless mesh and upholding different security levels. Combining both forwarding path calculation and policy places additional constraints on path calculation algorithms, and there is a need to resolve these constraints and provide expedited calculation of forwarding paths in mesh networks.

Routing protocols that are not adapted to run over radio networks may not calculate efficient or stable pathways. The radio network has limited bandwidth on the radio transmission, potential periods of radio signal degradation, and potential interference between transmissions of data. Thus, in view of the Limited bandwidth in mesh networks, there is a need for multiple pathways between two mesh points in order to provide load sharing across the network.

Links between the wired network and the wireless mesh, may occur at any mesh point. Policy and bandwidth may require that certain pathways to the wired network are preferred over others. Thus, there is a need to augment forwarding path calculations to allow policies or path calculation metrics to favor pathway to the wired networks over another. Wired links may be preferred due to bandwidth or due to their access to captive portals or Authentication servers.

Links between two wireless mesh networks may also occur, but the interconnection needs to be governed by unique policy. Using 802.11s additions to 802.11, the wireless mesh will have unique identification code. Two wireless meshes may interconnect at any, some or all nodes (PRIOR ART FIG. 3 gives an example of two mesh networks interconnected.) Forwarding path calculation need to differentiate between intra-mesh networks and inter-mesh networks or mesh networks and wired. Existing path calculations do not allow these considerations in the pathway calculations.

Traditional MAC level forwarding uses broadcast of multicast frames. The broadcast of these multicast frames may send frames to switches that do not have receivers for that multicast group. In traditional Local Area Networks (LANs) formed by Ethernet, this overhead of transmitting frames that will be discarded is not burdensome. In the radio environment with limited bandwidth, the extra transmission limits the capacity of the full system. Specific multicast distribution paths are needed to tailor forwarding paths to just the access points that must receive the information. Algorithms that calculate these multicast paths need to operate without heavy calculation overhead when the mesh network topologies change frequently due to interference in the radio domain.

Mesh networks may be of a small size (32 nodes or less) specified by 802.11s or grow to larger networks. The path calculation needs to support scalable growth with as the mesh expands by:

Numbers of mesh points in the mesh,
Numbers of radio physical and logical links between nodes,
Numbers of Stations associated with each mesh point that in turn may be accessed by the network, and
Numbers of MAC level multicast groups.

To summarize, traditional path calculation algorithms need to be augment to support the wireless mesh by existing paths and user policy regarding:

Supporting alternate paths based on MAC addresses based on any application QoS, 802.11e QoS,
Unicast or multicast traffic or traffic loading on links,
Resource constraints (power, RF frequency)
Connectivity to wired networks, other mesh networks,
Existence of security services (Captive portal or Authentication portal),
Levels of security, and
Existence of particular individual MAC or groups of MAC addresses.
Existing path calculation algorithms do not support all these factors within the path calculation for a mesh network.

Secure Pathways in Mesh Point Networks

Securing the data traffic that transverses a wireless mesh network via the air medium entails encryption of data traffic. In existing wireless networks with access points attached to switches (either local MACs or split MAC), the Authentication Server (AS) distributes keys to client stations associated an access point. Each station—access point has a pair-wise key. All stations from a particular access point share group key for broadcast data.

In a mesh network, traffic that flows between access points may be encrypted. To encrypt this traffic, each mesh point encrypts data. A mesh point has a pair-wise key for each remote mesh point to which it transmits data. In addition, each mesh point has a single key to encrypt broadcast information sent to all mesh points in its radio range. The mesh point with stations associated has the following keys:

Pair-wise key with each remote station,
Group key for all stations associated with mesh point,
Pair-wise key with each remote Mesh Point exchanging traffic with, and
Group key for transmission of data to all Mesh Points within radio range.

In deployments where security of a video stream or other multicast data needs to have a higher security than the general group key, an alternate group key for specific data transmission is desirable for this node. In the on-demand multicast group, the data between a set of mesh points may be encrypted using an alternate set of group keys from the mesh point's general group key. This alternate short-term group key for a mesh point may encrypt all data or data from a specific station associated with the node. The routing infrastructure exchanges an indication that these new group keys are requested; in this may be facilitated by either passing around a Group MAC address or passing an indicator that the node would like to use alternate group keys for all of its data. Traffic Encrypted with the new group need should only flow when both a multicast path and the encryption keys have been set-up at all stations and mesh-points supporting the on-demand secure multicast traffic flow. Thus, the path calculation (also called mesh routing infrastructure) must pass two indicators to start the on-demand secure pathways: 1) a mesh point desires set-up an on-demand multicast keys and 2) the mesh point has completed set-up of on-demand multicast keys. To terminate the on-demand secure pathways, the routing infrastructure needs to indicate that: 1) mesh point no longer desires that on-demand flow path, and 2) that the multicast on-demand secure pathways have been terminated.

As a non-limiting example, three stations want to share a secure on-demand multicast group is shown in PRIOR ART FIG. 2. Station 1 (201) wants to have an on-demand multicast forwarding path that does not share the node group keys with the existing broadcast keys when sending Group traffic to Group MAC address 1. As station 1 (201) transmits data to a Secure Group MAC address (80:00:01:01:01:01), policy on Mesh Point 1 (204) triggers the set-up of a secure multicast path to any other listeners. At the same point station 2 (202) and station 3 (203) request via higher level protocols (GMRP or proprietary protocols) to Mesh Point 2 (205) and Mesh Point 3 (206) that they are interested in receiving traffic for Secure Group 1 MAC address (80:00:01:01:01:01). Both of these mesh points utilize the routing infrastructure to pass an indication that an on-demand secure key needs to be set-up for group traffic transmitted between mesh points 1, 2 and 3 (204, 205, 206). Mesh Point 4 (207) does not desire to have the on-demand group key and retains its original group key.

Mesh Point 1 obtains a secure multicast key from the Authentication server to itself. Mesh Points 2 and 3 also obtain a new group key from the Authentication server for on-demand secure group. Once the keys are received, the path calculation algorithms calculate a specific multicast tree for the on-demand secure keys.

At some point in the future, Station 1 finishes sending its secure data and wishes to return to the use of the general node multicast key. Station 1 (201) has several ways of signaling this to Mesh Point 1 (204). As a non-limiting example, the mesh point can detect that no traffic has been sent for a period of time. At this point, the mesh point 1 (204) can signal to the rest of the mesh that the on-demand mesh point is no longer desired and that the path has been terminated. Mesh Point 2 and Mesh Point 3 can also decide based on a variety of mechanisms that they wish to stop receiving multicast traffic from the on-demand group.

Very Secure multicast data transmission of frames may require on-demand securing of a multicast group for a particular set of nodes. A military application that uses "Triple Plan" (Video, Voice and Data) sent to a multicast group may need on-demand security for voice only, video only, and data only or for all voice, video and data. An on-demand group encryption key per node may be required for a higher level of security. These and other limitations and inadequacies in the prior art are addressed by the present invention.

SUMMARY OF THE INVENTION

Embodiments of the invention include extensions to link state algorithms and to link state path vector algorithms which support the creation secure scalable wireless mesh networks based on a hybrid wireless/wired routing infrastructure. In embodiments of the invention, these extensions include:

Support for flexible calculation of network paths based on any combination of one or more of the following factors:
radio aware constraints (including, by way of example but not limitation, quality and throughput of applicable radio channels) and wireless mesh topology constraints (including, by way of example, availability of power at nodes in the wireless mesh), application and network Quality of Service (QoS), traffic engineering, user-enforced policies, resource constraints, existence of security services, wired network connectivity and connectivity between multiple wireless meshes. The routing infrastructure carries information that be used in path calculations based in link state algorithms or hybrid link state path vector algorithms.

Calculation of multicast forwarding trees, using link-state algorithms, for any group MAC address, or any pair of source or group MAC.

Calculation of multicast forwarding trees calculations using link-state path vector algorithms that allow policies (including default settings or policies manually set by network administrators) to set criteria for tie-breakers between multicast forwarding paths.

Link State Database exchange algorithms that minimize the Database information transmitted on limited bandwidth broadcast media (such as radio networks) and support a 2 stage update process that queries Link-State Announcement sequence numbers before updating a Link State Database for the wireless mesh network.

A radio-aware light weight routing protocol (ra-hello) that supports 1 hop and 2 hop radio aware topologies and passing security and routing information, and On-demand secure multicast path using alternate group keys for encrypting multicast data between nodes— Routing and security work together to set-up a new set of keys and multicast forwarding paths for a specific set of Group MAC addresses.

In embodiments of the invention, these extensions supporting flexible path calculations include:

Type-length-value descriptions that can be added link state packets sent as part of a database update, storing the type-length-valued descriptions in Link State Databases, and Performing constraint based calculations based on these parameters In embodiments of the invention, the calculation of multicast forwarding trees utilizes either a link state or link state path vector protocols to:

Pass information about the mesh point topology,

Pass information regarding group MAC addresses and (Source, Group) MAC addresses associated with each mesh point, Pass weighting information to allow multiple equal-cost paths to be turned to a single path, and Use Link state topologies to calculate forwarding path rooted at a mesh node for a set of Group MAC addresses.

These and other embodiments of the invention are described further below.

DESCRIPTION OF FIGURES

PRIOR ART

PRIOR ART

PRIOR ART

FIG. 11 illustrates a database request and update for multiple wireless nodes, in accordance with embodiments of the invention.

FIG. 12 illustrates an example of type-length-value fields for a hello message in a wireless mesh network, in accordance with embodiments of the invention.

DETAILED DESCRIPTION OF THE INVENTION

Definitions

Figure 1:
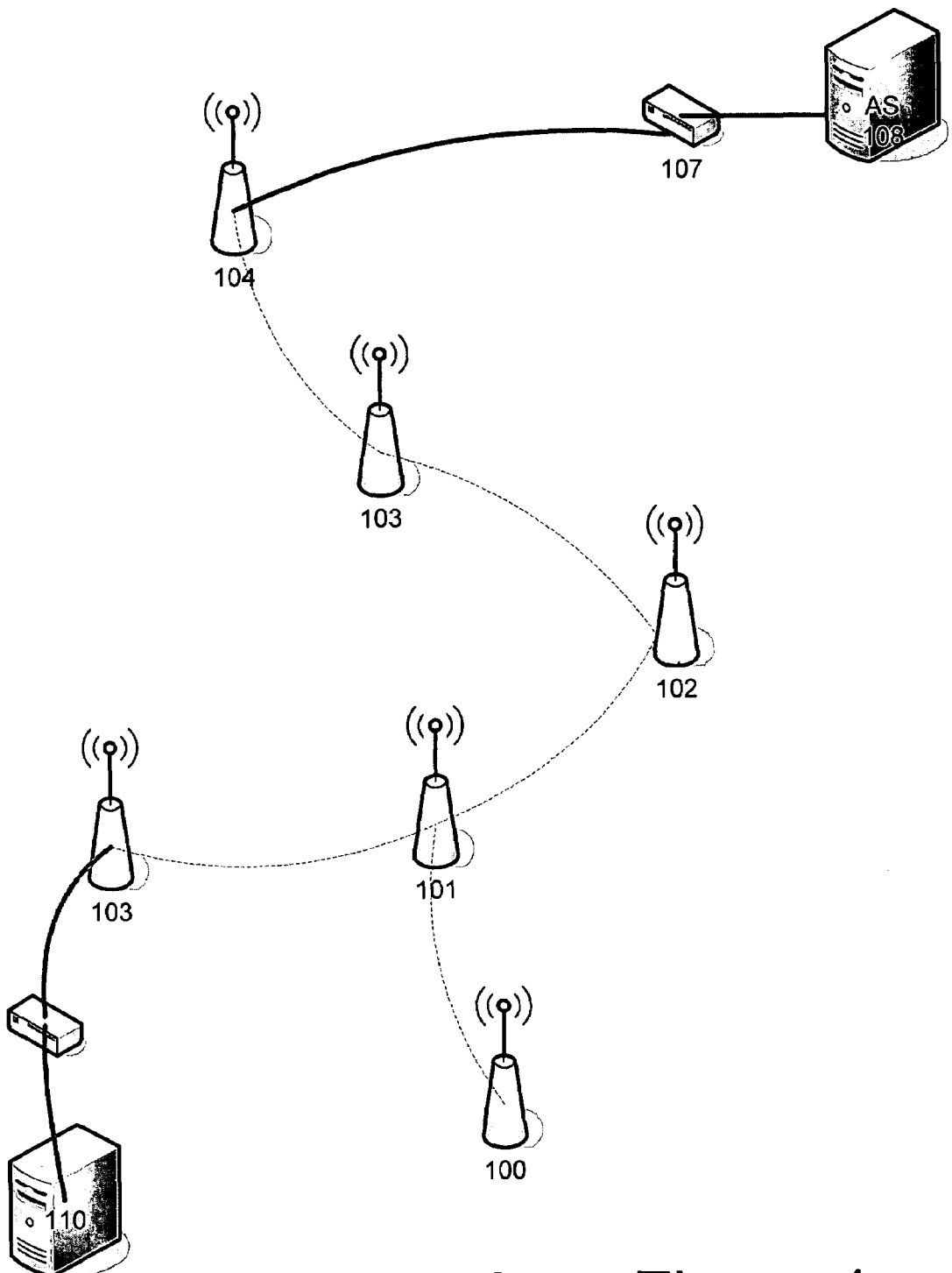
FIG. 1 illustrates an example of a Wireless Mesh Network with an Authentication Server.
Figure 2:
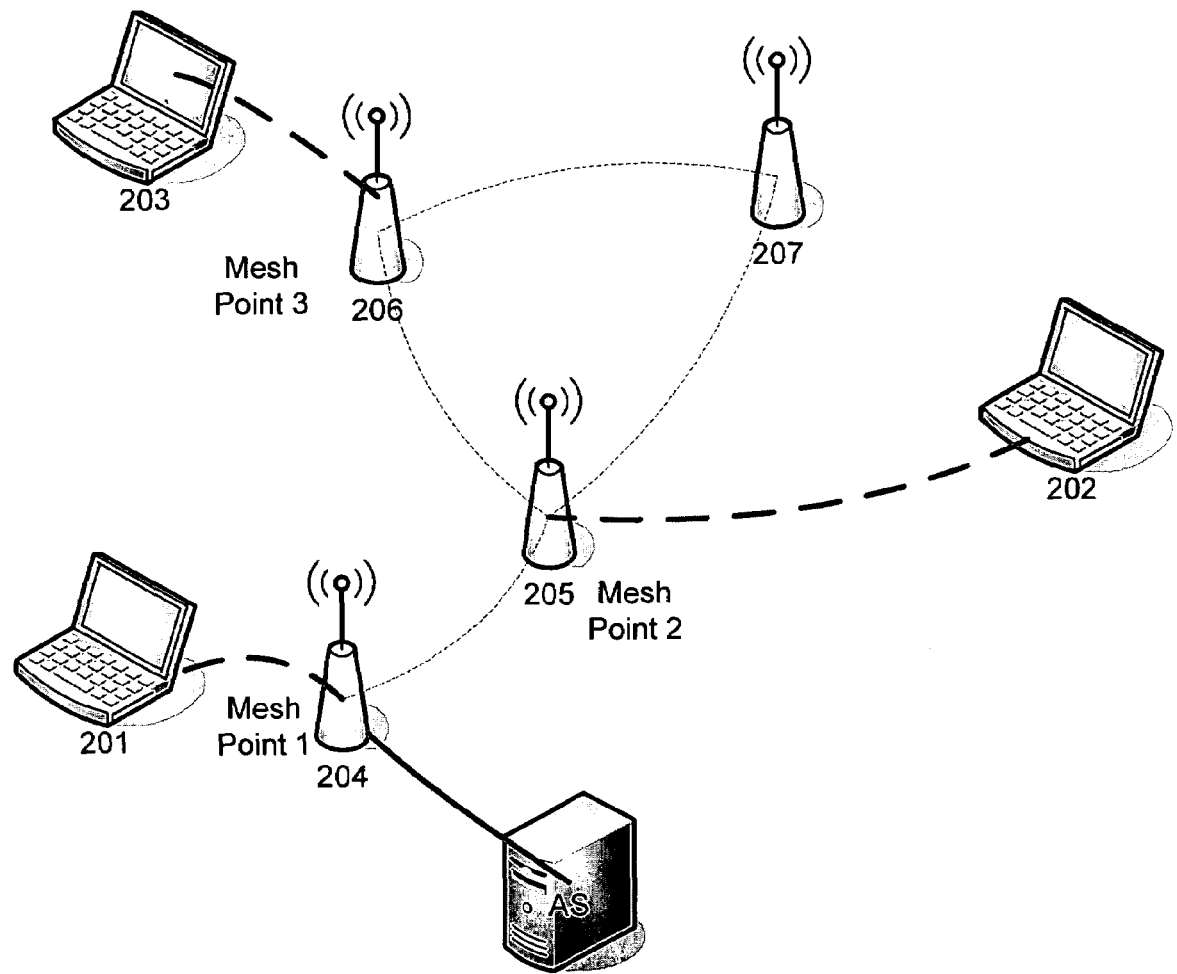
FIG. 2 illustrates an example of an on-demand secure wireless mesh infrastructure.
Figure 3:
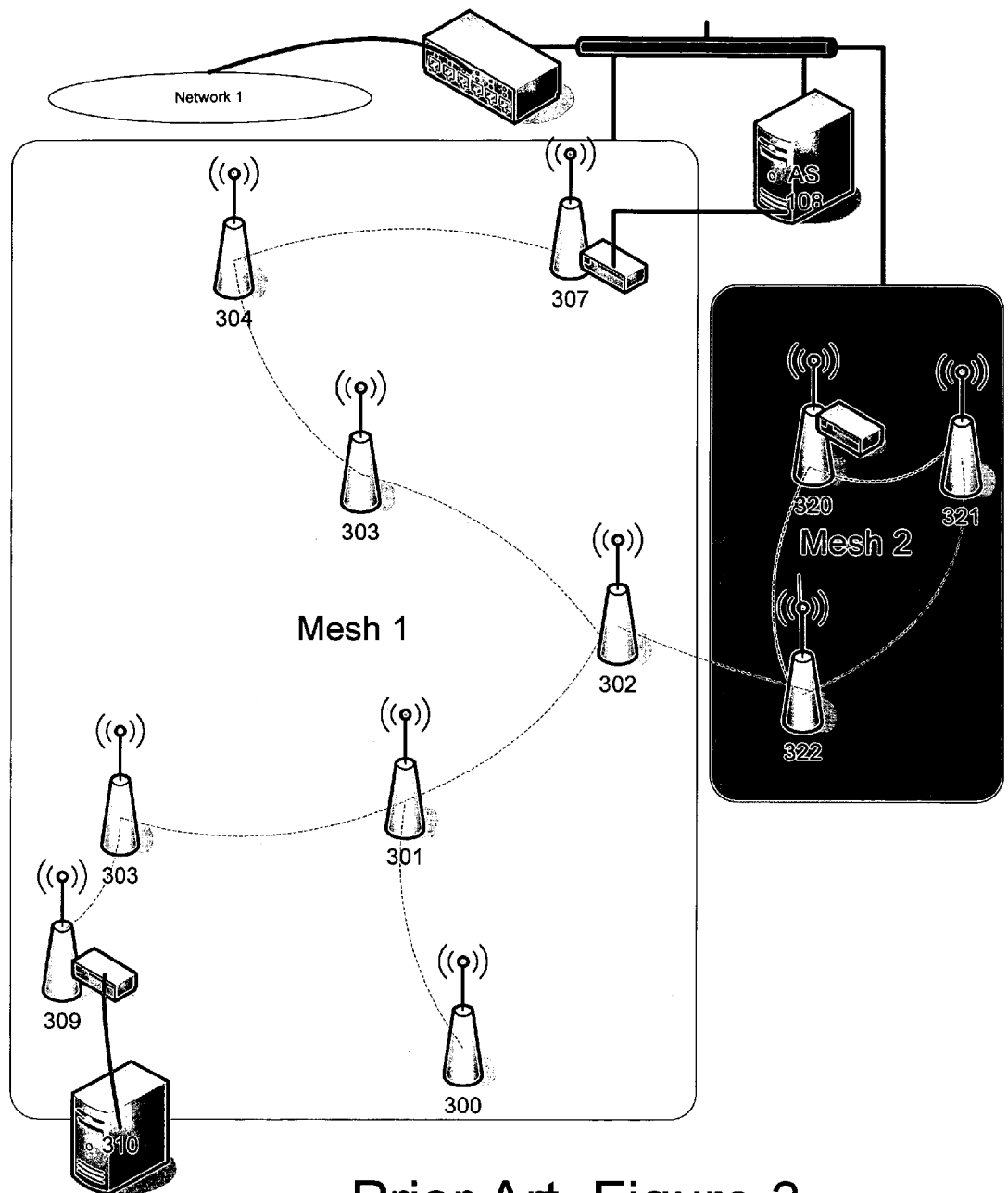
FIG. 3 illustrates an example of two Wireless Mesh networks inter-connected and connected to a wired network infrastructure.

The following terms, when used herein, shall have the meanings set forth below:

802.11: An IEEE standard for layer 2 wireless local-area networks. The standard includes, by way of example but not limitation, 802.11b, 802.11a, and 802.11g, which define the layer 1 physical media behavior of different types of wireless networks.

WiFi: Refers to 802.11

Access Point, or "AP": A wireless device or a logical function that bridges wireless/802.11 enabled devices from the wireless 802.11 network to the wired networks.

802.16: An IEEE standard for layer 2 wireless networks, comprising an interface for fixed broadband wireless access systems.

WiMax: Refers to 802.16

Base Station or "BS": An 802.16 equivalent of an 802.11 AP.

IETF: refers to that certain standards body known as the Internet Engineering Task Force.

Mesh Network: a set of Access Points colluding together as a mesh of nodes to deliver layer 2 traffic between the Access Points.

Local MAC: A centrally controlled wireless architecture where wireless encryption/decryption and bridging of 802.11 to 802.3 is performed on the Access Point.

Split AP: Synonym for Local MAC.

Split MAC: A centrally controlled wireless architecture where bridging of 802.11 to 802.3 and/or wireless encryption/decryption is performed on a centralized device, such as, by way of non-limiting example, a Wireless LAN Switch Ethernet: A widely deployed wired layer 2 technology for connecting devices, defined by IEEE 802.3.

IP: Internet Protocol, as defined by IETF RFC 791.

MAC layer: Media Access Control layer, also known as "Layer 2"; refers to the packet formatting and protocol used to communicate between two devices.

Client: For hardware, refers to a client device, such as, by way of example but not limitation, a PC, PDA, or other wireless client device. For software, refers to the layer 2 or layer 3 software entity that enables communications on client hardware.

Wireless Station: Synonym for Wireless Client.

Encryption: Scrambling of data to prevent viewing, tampering, and replay from unauthorized sources.

Authentication Server: Server that distributes encryption keys to the wireless mesh node via security protocols. By way of example but not limitation, a set of protocols for 802.11 meshes are 802.11i for signaling the security hints regarding keys, 802.1x for transmitting keys, and Radius for key and user information.

Layer 1: Communications between different devices at the physical layer (by way of example but not limitation, wired, optical, or wireless).

Layer 2: Communications between two devices and the data link layer/MAC layer. Devices may use the same packet formats and MAC layer protocols, but may use different physical media.

Layer 3: Communications between two devices at the network layer, usually implying IP communications. Devices communicating at Layer 3 need not use the same Layer 2/MAC layer protocols. Layer 3 and IP may be used to communicate between different Layer 2 devices over the Internet.

Heavyweight Access Point: An Access Point that implements all of the 802.11 MAC layer for an access point. A Heavyweight Access Point may provide user authentication, encryption, data forwarding, and management capabilities.

Lightweight Access Point: An AP that typically implements only time-sensitive components of the 802.11 protocol. Some Lightweight Access Points also implement data encryption. Lightweight Access Points may be used in conjunction with a wireless LAN switch.

Link State Path Vector: refers to routing algorithms and protocols that are further described in U.S. Utility application Ser. No. 10/648,758, Dated Aug. 25, 2003, Inventor Susan Hares, entitled "Systems and Methods for Routing Employing Link State and Path Vector Techniques"

LWAPP: Lightweight Access Point Protocol specified in an IETF Draft.

VLAN: A virtual LAN as defined by IEEE 802.

BSS or 802.11 "Basic Service Set": a set of wireless stations attached to a single AP and identified by a BSSID.

ESS: An "Extended Service Set" in 802.11, comprised of a logical wireless LAN spanning multiple BSSs.

SSID: Service Set Identifier for an ESS advertised in 802.11 management frames to aid wireless clients in discovering the ESS.

Tunnel: A logical link between two elements of a network, that may use encapsulation to traverse diverse or routed networks. A non-limiting example of a tunnel is a GRE tunnel between two IP endpoints.

Null Tunnel: A logical tunnel between network elements using no additional encapsulation other than the native encapsulation of the link between them. As a non-limiting example of a Null Tunnel, network elements may be directly connected to each other via an Ethernet cable.

802.11i: IEEE 802.11 MAC Layer Security Enhancements 802.11r: IEEE 802.11 Fast BSS Transition Enhancements.

Roaming: Refers to wireless Clients moving from one radio attachment point to another in a wireless network.

Mobility: A wireless network feature which preserves the current (logical) link between a wireless client and a wireless network. By way of non-limiting example, this may refer to Layer 2 or Layer 3 links.

PFE: Packet Forwarding Engine—A data forwarding abstraction used in this invention implemented in hardware or software.

WiFi VPN: A set of CAPWAP and VPN protocols using WiFi technologies described in U.S. patent application Ser. No. 10/982,598, which is hereby incorporated by reference in its entirety.

X.509: Public Key Certificate format—ISO Standard 9594-8:2001, ITU-T Recommendation X.509, March 2000.

PKI: Public Key Infrastructure

Unicast traffic: Unicast traffic may include Layer 2 frames or Layer 3 packets sent from a source machine to one remote machine. A non-limiting example of a Layer 2 frame is an Ethernet frame with destination MAC address without the "Group" bit set. A non-limiting example of a Unicast Layer 3 packet is an IP packet with a destination address that is a unicast IP address.

Multicast traffic: Multicast traffic may include Layer 2 frames or Layer 3 packets sent from a source machine to multiple destinations. A non-limiting example of a Layer 2 frame is an Ethernet frame with a destination MAC address with the "Group" bit set. A non-limiting example of a Multicast Layer 3 packet is a IP packet with a destination address that contains a Multicast IP address.

Overview

Embodiments of the invention include extensions to link state algorithms and to link state path vector algorithms that support the creation of secure scalable wireless mesh networks based on a hybrid wired/wireless routing infrastructure. These extensions form orthogonal pieces of functionality that can be implemented individually or a groups to provide secure scalable wireless mesh. These extensions include:

Support for flexible calculation of path networks based on any combination of one or more of the following parameters: wireless mesh based radio aware constraints (such as, by way of example but not limitation, quality of relevant radio channels), wireless mesh topology constraints (such as, by way of example, power constraints, network topologies), application and network QoS, traffic engineering, user-administered policies, resource constraints, existence of security services, wired network connectivity and connectivity between multiple wireless meshes. In embodiments of the invention, these extensions may include additional data fields in type-length-value form that are passed as part of the link-state database update, stored in the link-state database, and used in the path calculation.

Calculation of multicast forwarding trees using link-state algorithms that support trees for any group MAC address, or any pair of source or group MAC addresses.

Calculation of multicast forwarding trees using link-state path vector algorithms that allow default or manually set policies to set the tie-breaking criteria between multicast forwarding paths.

Link State Database exchange algorithms that minimize the database information transmitted on limited bandwidth broadcast media (such as, by way of non-limiting example, radio networks) and support a two (2) stage update process that queries Link-State Announcement sequence numbers before updating the Link State Database.

A radio-aware light weight routing protocol (referred to herein as "ra-hello") that supports 1 hop and 2 hop radio aware topologies as well as the exchange of security and routing information, and On-demand secure multicast path using alternate group keys for encrypting multicast data between nodes—In such embodiments, routing and security systems interact to set-up a new set of keys and multicast forwarding paths for a specific set of Group MAC addresses. Upon detection that a mesh node (i.e., a node in a mesh network) wants to receive data from "On-Demand" Secure Group MAC, the mesh node allocates and uses an alternate group key for multicast forwarding to that secure MAC.

These and other embodiments are further described herein.

Support for Flexible Path Calculations

Embodiments of this invention include extensions to a link state protocol (such as, by way of example, ISIS or OSPF) or a link state path vector protocol to:

Pass routing information in Type-Length-Value (TLV) descriptions that can be added the data base distribution packets.
  Storing the type-length-value descriptions in the link state database, and
  Using the information from the TLVs as part of constraint based path calculations for network traffic.

Figure 4:
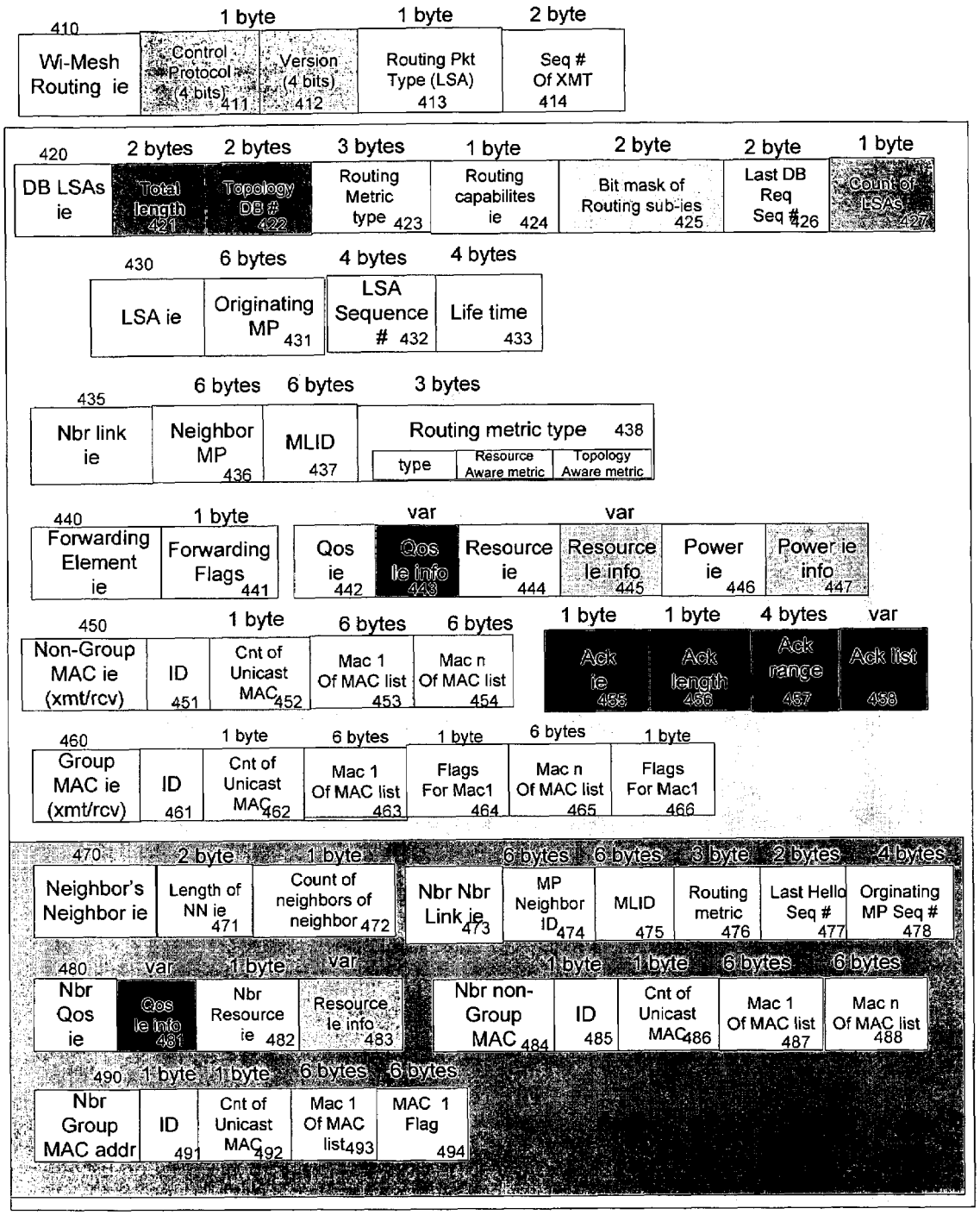
FIG. 4 illustrates Type-Length-Value fields carrying information for routing in wireless mesh networks, in accordance with embodiments of the invention.

Database distribution packets may be, by way of example, Link State Packets in IS-IS, Link State Announcements in OSPF or Link State Path Vector LSP Packets. Embodiments include:

Storing Type-Length-Value descriptions in a Link State Database, and
  Performing constraint based calculations based on these parameters Embodiments of the invention include a Type-Length-Value format referred to herein as a "Wireless Mesh Routing TLV". Non-limiting examples of type-length-value (TLV) descriptions used in embodiments of this invention are shown in FIG. 4 in the form of 802.11 Information Elements (or "IE(s)"). The Information Element has a 1 byte type field, followed by a 1 byte length field.

The TLVs depicted in FIG. 4 include the following
1. Routing Category TLV (410)—this routing category TLV allows the routing protocol type and version that initially provided the routing information to be exchanged between mesh points. This field indicator is used as either part of an existing link-state or link-state path vector protocol or part of the hello protocol. This field contains the following information
   a. Path Calculation Control Protocol (411)—gives the path calculation protocol such as, by way of non-limiting example, link-state OSPF, link-state ISIS, hybrid link-state path vector.
   b. Version of the path vector protocol (412)
   c. Routing packet type: by way of non-limiting examples, these may be hello, link state update, or database request or database update (413)
   d. Sequence number of transmitted TLV formed
2. The Database LSAs IE—this provides a TLV that further groups a set of TLVs to form an update message. The database IE contains: header information for this database, followed by a sequence of Link-State-Announcement (LSA) information elements (TLV groups). The Database LSA IE (TLV) header field (420) contains:
   a. Total length of the grouping of TLVs (421)
   b. Topology Database Identification number (422)
   c. Routing metric type (423)—This contains the radio aware metric type, the topology aware type, and the preference between radio and topology aware.
   d. Routing capabilities (424)—A flag byte indicating what capabilities this database includes
   e. Routing sub-IEs (425)—Flags bytes indicate what type of IEs are contained within the LSA IEs
   f. Last Database Request Sequence number (426)—This field contains the sequence number for the last database update request.
   g. Count of LSA IE (427)—this contains the count of the LSAs that follow
3. In embodiments of the invention, each LSA IE contains LSA origination information (430). The origination information may include the originating Mesh Point (MP) (431), LSA sequence number (432) and the life time value (433). Optionally it can contain also contain the following information element (TLVs):
   a. Neighbor link information element (IE) (435)
   b. Forwarding information element (IE) (440)
   c. QoS information element (IE) (442)
   d. Resource information element (IE) (444)
   e. Power information element (IE) (446)
   f. Non-Group MAC address information element (IE) (450)
   g. Group MAC address information element (IE) (460)
   h. ACK information element (455)
   i. Neighbor's Neighbor (470)
   j. Neighbor Neighbor Link IE (473)
   k. Neighbor QoS IE (480)
   l. Neighbor Resource IE (482)
   m. Neighbor non-group MAC It (484)
   n. Neighbor Group MAC IE (488)

In embodiments of the invention, the foregoing TLVs may occur one or more time.

The information elements inside of LSA E are:
1. Neighbor Link E (430) contains the following fields
   a. MAC address of neighbor Mesh Point (436)
   b. MLID—Logical ID for link connecting to the remote neighbor (437)
   c. Routing metric type—gives 3 field that indicate routing metric type, radio-aware metric, and topology aware metric
2. Forwarding Element (IE) (440)—contains a 1 byte field for forwarding flags. Forwarding flags (441) include (but are not limited to) unicast, multicast, and power-aware.
3. QoS IE (442)—QoS IE contains a variable list of QoS parameters. This QoS IE info field is variable in length with the length specified in the TLV format.
4. Resource IE (443)—The Resource IE field contains a variable field that provides information on resources that include (but are not limited to) to RF resources (channel, frequency or bandwidth), CPU resources, or memory resources.
5. Power IE (446)—In embodiments, the Power IE field contains a variable size set of parameters about power usage or status. These parameters may contain, by way of example but not limitation, parameters about remaining battery life or current power utilization or total power available.
6. Non-Group MAC address (450)—This IE contains a list of non-Group MAC addresses. This field has an ID that identifies this grouping of MAC addresses, followed by a count of Unicast MAC address, and a list of MAC address (1 to n MACs)
7. ACK IE (455)—This field has a list of ACK, or "acknowledgement" messages for different LSA sequence numbers. The fields in this IE are length of the ACK value (2 bytes by default), range of sequence numbers ACK (457) contain start and end, followed by a list of ACK sequence values.
8. Group MAC address IE (460)—This field has an ID (461), followed by a count of Group MAC addresses (462) followed by a list Group-MAC address-flag pairs.
9. Neighbor's Neighbor IE (470)—is a IE that contains information about the neighbors of a Mesh Point's neighbor. This field has a header followed by the inclusion of a Nbr's Nbr link IE (473) or a Nbr QoS IE (480) or a Nbr Resource IE (482) or a Nbr Non-Group MAC (484) or a Nbr Group MAC address (490). The header information contains the total length of the full neighbor field (471) plus a count of the neighbors of the neighbor.
10. Nbr Nbr link IE (473)—contains a neighbor linked to this neighbor (474), the link the neighbor's neighbor is connected over, the routing metric associated with the link, the sequence number of the last hello received by this neighbor (477), and the last LSA sequence number from the Neighbor's neighbor.
11. Nbr QoS IE (480)—the QoS IE field from the nbr is forwarded in this TLV.
12. Nbr Resource IE (482)—the Neighbor's Resource IE is forwarded in this TLV.
13. Nbr Non-Group MAC IE (484)—The Neighbor's Non-group MAC field is forwarded in this TLV. The IE field contains a ID field that allows the MAC addresses to be grouped.
14. NBR Group MAC IE (490)—The Neighbor's Group MAC field is passed in this TLV.

In embodiments of the invention, the Link State databases are expanded to include the information passed in these topologies. Constraint based calculations can specify any of these in calculating a best network path through the mesh network. A TE calculation runs both the basic SPF to determine links without constraints and then re-runs the SPF calculations with constraints. In embodiments of the invention, the SPF calculation includes the following steps:
Step 0—initializing the TENT and PATH structures
Step 1—Examine the Zero length Link State topology packet and process
Step 2—if the Tent is empty, then stop. Else iterate to add additional links In some embodiments, the foregoing algorithm is modified for constraints to be:
Pre-select out nodes by: removing all nodes and links that do not support constraint based routing and remove all nodes that do not meet the constraints
Run SPF calculation above with this limited set of nodes
Run reduced flooding calculations to minimize the flooding of new information.

Calculation of Multicast Forwarding Trees Using Link-State Algorithms

Embodiments of this invention exchange information in the TLVs regarding Unicast MAC addresses and Group MAC addresses associated with a Mesh Point. In embodiments, the Group MAC addresses are passed in the Group MAC IE (460) or the Neighbor Group MAC (490) as shown in FIG. 4.

The calculation of multicast forwarding trees utilizes either a link state or link state path vector protocols to
Pass information about the mesh point topology,
Pass information regarding group MAC addresses and (Source, Group) MAC addresses associated with each Mesh Point,
Pass weighting information to allow multiple equal-cost paths to be turned to a single path, and
Use Link state topologies to calculate forwarding path rooted at a mesh node for a set of Group MAC addresses.

The Light weight routing protocol ("ra-hello"), which is used for a 1-hop to 2-hop protocol, uses:
Single ra-hello message to send information between mesh points, The information is passed in a Type-length-value (TLV) fields as described in previous section on path calculation (Group MAC addresses or Neighbor's Group MAC addresses).

Embodiments of this invention calculate multicast forwarding paths between mesh points sending to a multicast group and those receiving from a multicast group. A single tree rooted at a mesh point is calculated to all other mesh points receiving the mesh point.

In embodiments of the invention, the foregoing calculation is performed by the following steps:
Remove all nodes that will not forward multicast (denoted in the forwarding element IE field as unicast only),
For each Group MAC address sourcing data from this node:
Remove as end mesh nodes all nodes those except those reporting the multicast group MAC address,
Create Group-MAC entry with: Group MAC address, list of Mesh Points that includes this MAC address
Check to see if this Group-MAC entry matches an existing Group-MAC table entry. If so, add This Group MAC as Secondary MAC to this entry. If no match, add a new entry
Calculate the shortest path tree from each for each Group Entry in the Tree.
Check to see if the Multicast path contains an Equal-coast multi-path (ECMP) from this node
If no ECMP, finished with this step.
If ECMP from this node, select a main path based on user policy, or lowest Mesh Point Id/Mesh Point Link ID tuple. Update a TLV with a different metric for this link and distribute with next link state update to neighbors.

Figure 5:
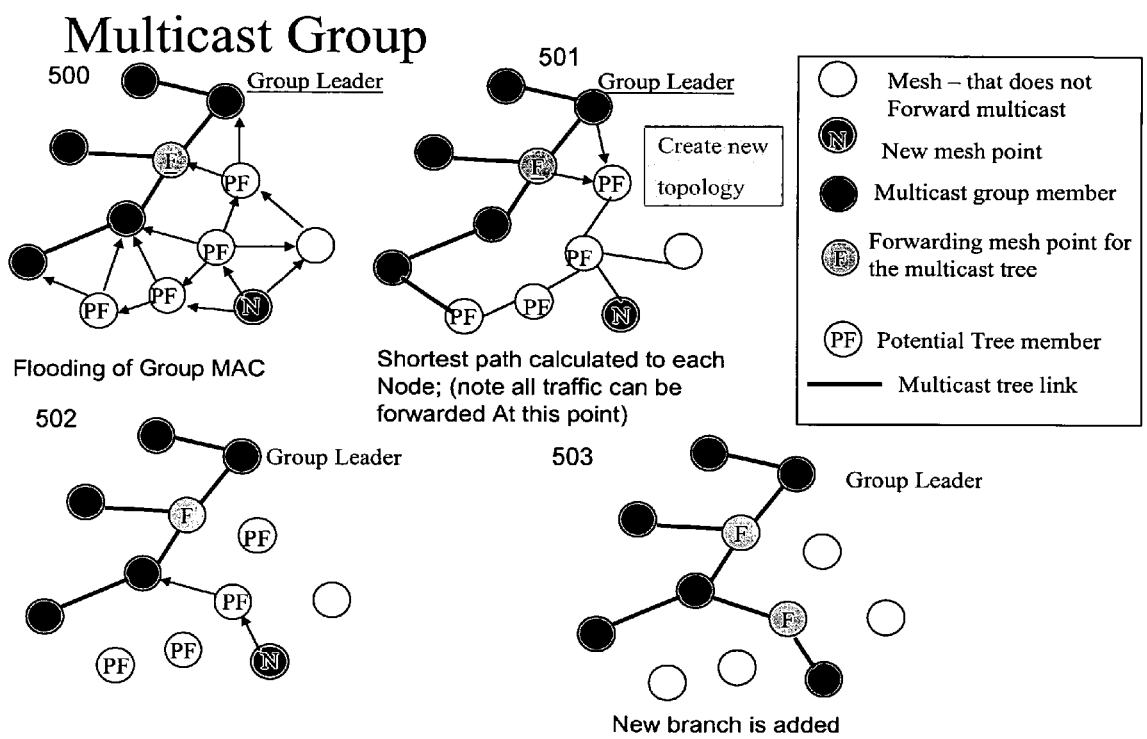
FIG. 5 illustrates the addition of a multicast group in a mesh network, in accordance with embodiments of the invention.

FIG. 5 shows an illustrative, non-limiting example of the addition of one node (node N) sending traffic to several receivers (denoted by the shaded nodes). Diagram 501 in FIG. 5 shows Node N flooding the Group MAC IE via the link-state packets to potential forwarders (PF) and to final receivers (shaded nodes). In stage 2 shown as element 502 in the figure, a shortest path calculation from Node N is calculated to all receiving nodes. In stage 3 shown as FIG. 503, the algorithm selects a single path from this node to the distribution tree from the original node and then sends out an updated metric in the flag associated with the Group MAC from that node. In stage shown as FIG. 504, the forwarding table entries have been updated to select a single path.

Figure 6:
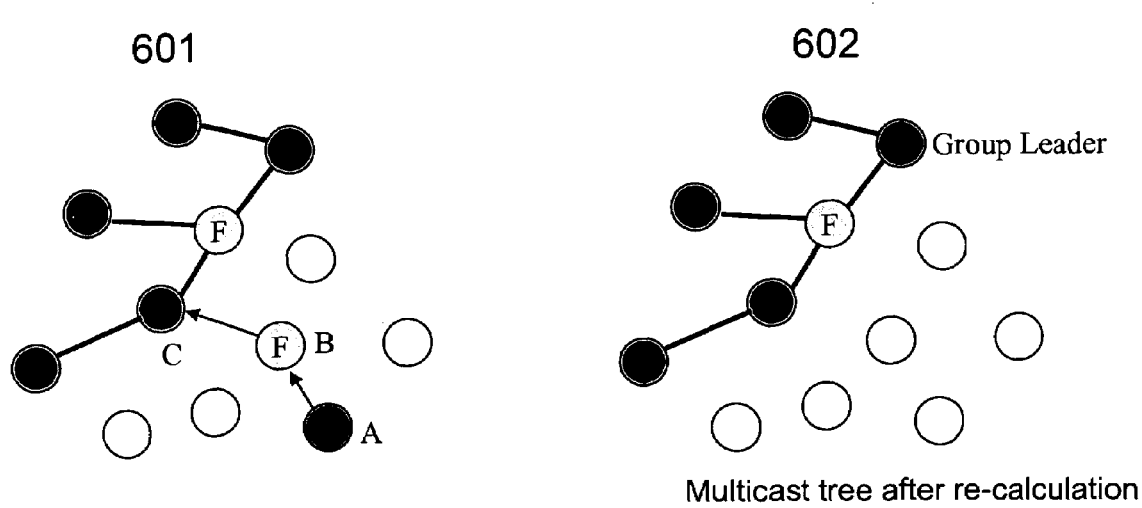
FIG. 6 illustrates the deletion of a multicast group from a mesh network, in accordance with embodiments of the invention.

This multicast path calculation occurs after a normal Shortest-Path Link-State algorithm calculates distances and shortest pathways to mesh points. As shall be apparent to those skilled in the art, if a Group MAC or a node's announcement of Group MAC is removed, the next link state calculation runs and updates the link state database, the Group MAC address will no longer exist in the database. At this point, the multicast algorithm above will remove the tree rooted on that source node. FIG. 6 shows, as a illustrative, non-limiting example, a mesh with Node A being removed (601) and the resulting removal from the multicast forwarding path (602).

Figure 7:
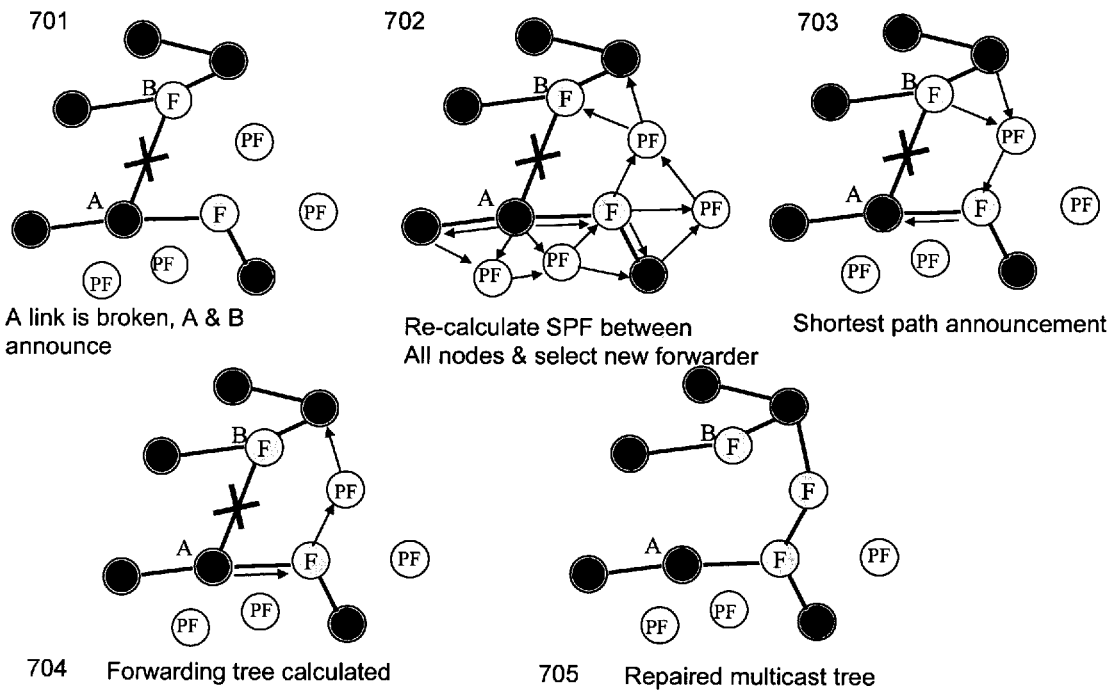
FIG. 7 illustrates the repair of a multicast tree in a mesh network, in accordance with embodiments of the invention.

Should a Tree link Break, each node re-calculates the shortest path to all Mesh Points having the Group MAC associated using the algorithm above. FIG. 7 provides a step by step indication of how this algorithm works with a broken link. Item 701 shows how a link breaks in the middle of the network. Item 702 shows how the recalculation selects a new forwarder (based on link state SPF and multicast algorithm running). Item 703 show how shortest path routes an alternate path between A and B. Item 704 shows the forwarding path being calculated. Item 705 show the repaired tree with new forwarding state.

Link State Database Exchange Algorithms that Minimize the Exchange of Database Information Transmitted on Limited Bandwidth Broadcast Media Embodiments of the invention enable one or more of the following:

- Transmission of Link State announcements by multiple nodes encrypted by Group Multicast key from a Wireless Mesh Node to its neighbors. The originating node waits for ACK from neighbors prior to re-transmitting to a specific neighbor the link state database update.
- A two stage update process that queries Link-State Announcement sequence numbers before updating the Link State Database.

In the transmission of Link State announcements, multiple nodes send back an ACK for the set of received LSA IEs. The "ACK IE field" (item 454, FIG. 4) gives the ACK that can be sent from a particular field upon receipt. The algorithm for transmitting is:

1. Transmit link State Announcements from a node to a local layer 2 multicast group appropriate for the link state protocol (which may be, by way of non-limiting example, OSPF, ISIS, or LSPV) using the node's group key
2. Wait for a locally configured time to receive a Wi-Mesh routing IE with a DB LSA IE with ACK IEs with the sequence number.
3. If the time expires prior to receiving the ACKs, go back to step 1 until all nodes have ACK the LSA Database update.

Figure 8:
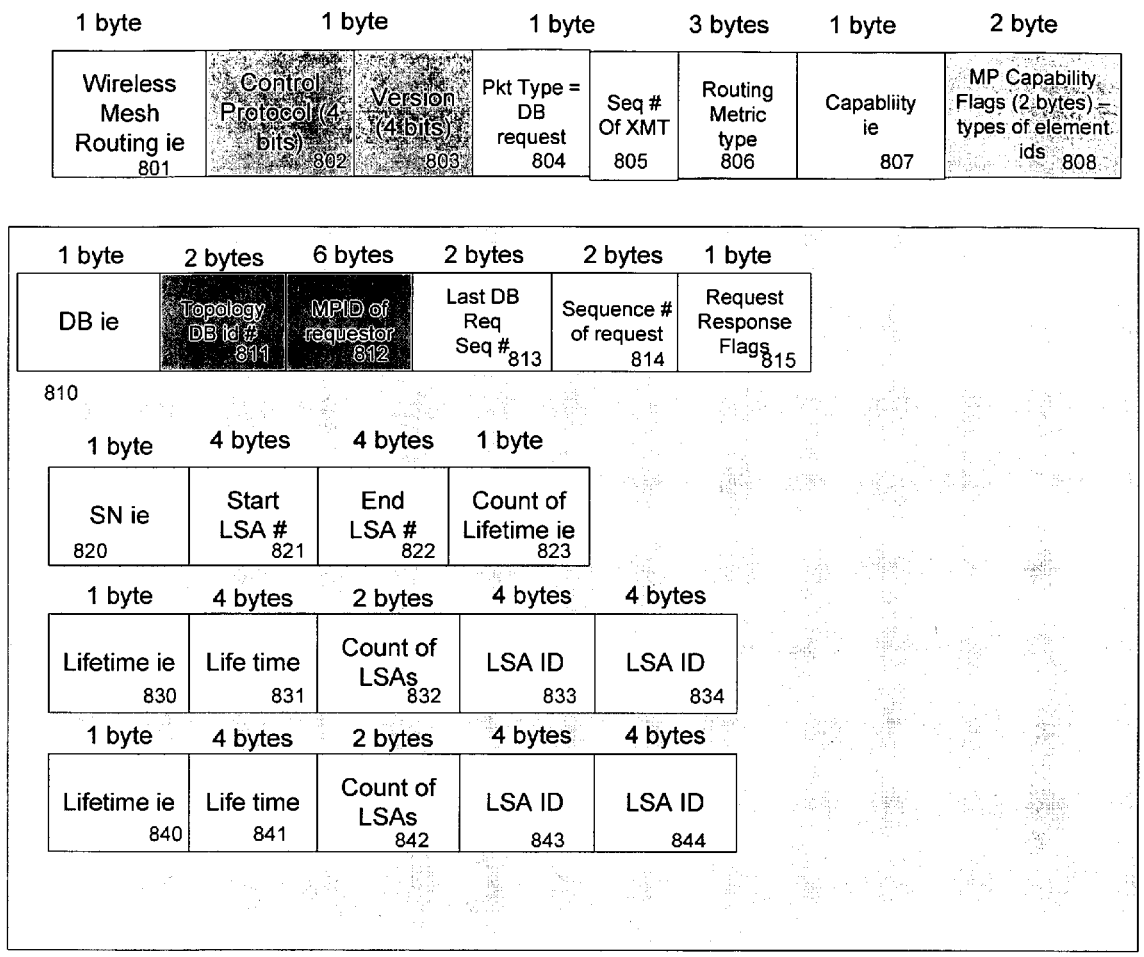
FIG. 8 illustrates requests TLVs for request and response messages in a mesh network, in accordance with embodiments of the invention.
Figure 9:
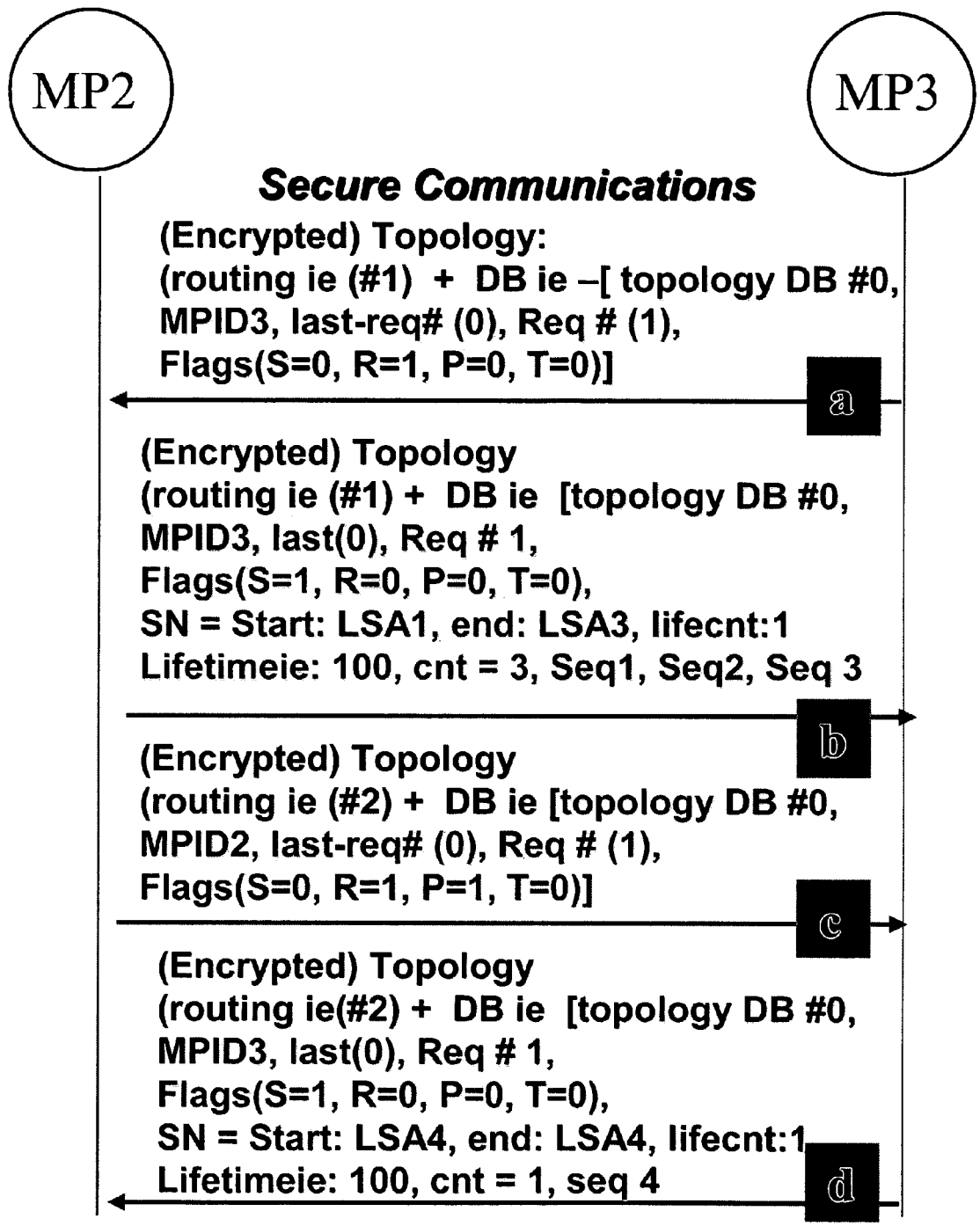
FIG. 9 illustrates steps to update a network mesh routing database, in accordance with embodiments of the invention.
Figure 10:
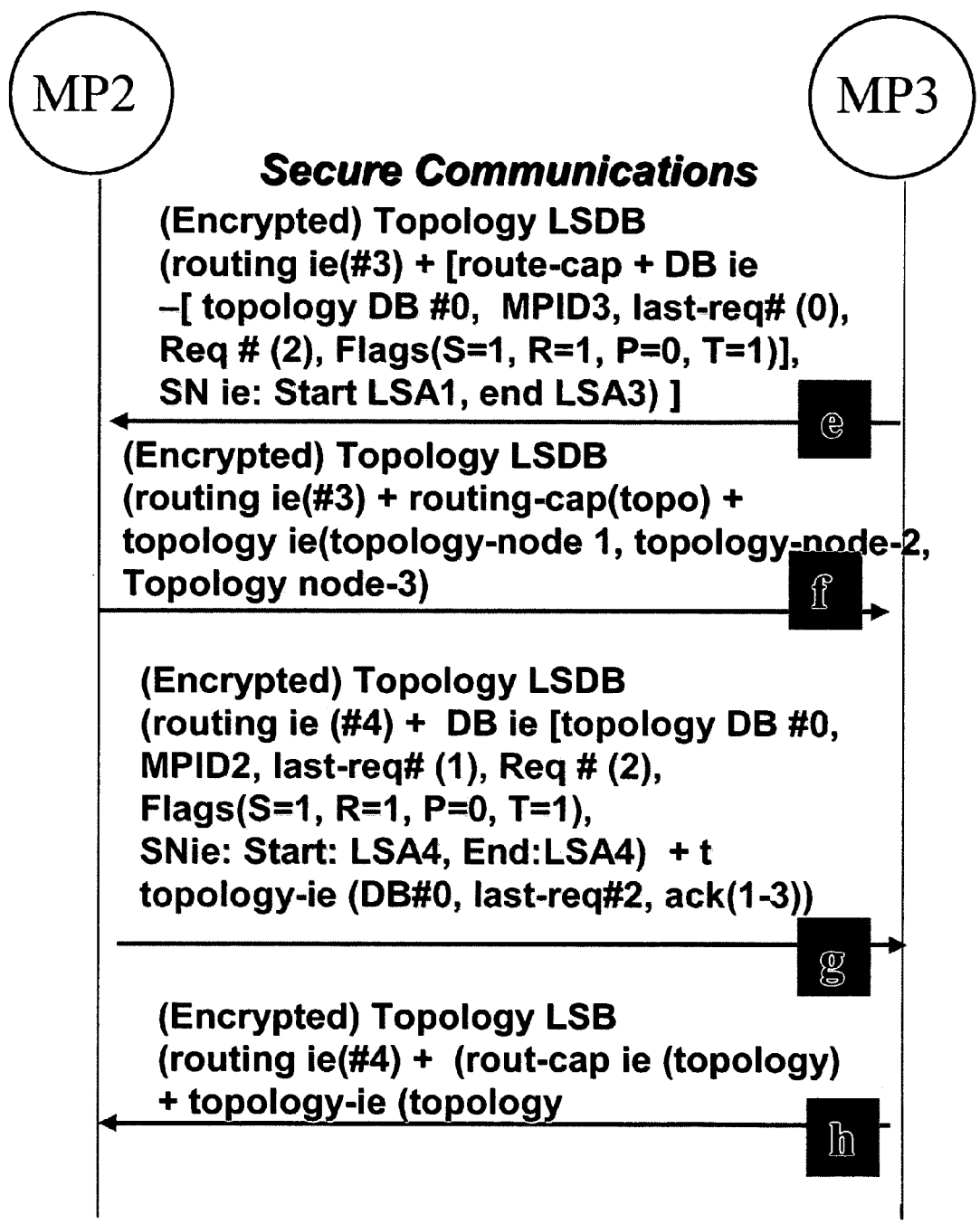
FIG. 10 illustrates additional steps for updating the network mesh routing database, in accordance with embodiments of the invention.

For a two stage update process, embodiments of the invention include additional information passed in the appropriate Link State messages. This information is a set of TLVs denoted as the "DB request/response" shown in FIG. 8. The TLVs included are:

1. Wireless Mesh Routing IE for a DB packet type (801) which includes:
   a. Type denoted wireless mesh routing IE
   b. Length of the field
   c. Control protocol (4 bits)—link state or hybrid link state
   d. Version (4 bits)
   e. Packet type—DB request/response
   f. Sequence of TLVs—2 bytes of sequence number for ordering of these TLVs
   g. Routing metric type—3 bytes: type flags, radio-aware metric, topology aware
   h. Capability IE—flags for the types of capabilities supported by this node
2. Database IE contains [810]
   a. Type—Database IE
   b. Length of IE
   c. Topology DB id # [811]—ID number used to identify the topology in multiple topology overlays
   d. MPID of requestor [812]—MAC address of Mesh Point requesting update
   e. Last DB Request Sequence # [813]—sequence number of last database request
   f. Sequence number of request [814]—sequence number for this request
   g. Request/Response flags (1 byte) [815]
      i. Flags: (XXX SPTR)
      ii. R=Request (1), 0—Reply
      iii. T—Transmit LSA in response (1=transmit, 0=Response)
      iv. P—Partial Sequence number response
      v. S—Sequence number list follows
   h. Sequence Number IE [820]
      i. Type—Sequence number IE
      ii. Length—length of IE
      iii. Starting of LSA sequence number (4 bytes)
      iv. End (Last) LSA sequence number (4 bytes)
      v. Count of lifetime IE that follow (may be zero)
   i. Lifetime IE (one or more may follow) [830, 840]
      i. Lifetime value
      ii. Count of LSAs at lifetime
      iii. LSA ID list FIG. 9 shows an illustrative, non-limiting example of a Database Request sequence. FIG. 10 illustrates a non-limiting example of a down loaded LSA. The database request sequence in FIG. 9 undergoes the following steps:

Step (a) MP 3 requests the DB from MP 2
The packet includes:
   Topology DB id=0 (default)
   Requestor—MPID3
   Last Request: 0—no earlier request
   Request: #1—first request
   Flags:
      S=0—SN IE included—so give all LSAs
      R=1—request for information on this node
      P=0—not a partial request
      T=0—transmit
Step (b) MP2 responds to the DB request with list of LSAs
The packet includes:
   Topology DB id=0 (default)
   Requestor: MPID3
   Last Request: 0—no earlier request
   Request: 1
   Flags:
      S=1—SN IE included
      R=0—response to request of DB request
      P=0—not a partial request
      T=0—echo of transmit flag
   SN IE
      Start LSA sequence #1—start of LSA Sequence #
      End LSA sequence #2—end of sequence #
      Lifecnt—count of lifetime blocks
Life-time E
   Time—100 counts
   Cnt 3
   LSAs: 1, 2, 3
Step (c) MP 2 requests the DB from MP 3
The packet includes:
   Topology DB id=0 (default)
   Requestor—MPID2
   Last Request: 0—no earlier request
   Request: #1—first request
   Flags:
      S=0—SN IE included—so give all LSAs
      R=1—request for information on this node
      P=0—not a partial request
      T=0—transmit
Step (d) MP3 responds to the DB request with list of LSAs
Topology DB id=0 (default)
Requestor: MPID2

Last Request: 0—no earlier request
Request: 1
Flags:
   S=1—SN IE included
   R=0—response to request of DB request
   P=0—not a partial request
   T=0—echo of transmit flag
SN IE
Start LSA sequence #1—start of LSA Sequence #
End LSA sequence #2—end of sequence #
Lifecnt—count of lifetime blocks
Life-time IE
Time—100 counts
Cnt 3
LSAs: 1, 2, 3

FIG. 10 illustrates the downloading of the Link state Database with steps e through step h of the process. These steps are:

Step (e) MP 3 requests the DB from MP 2 with the following TLVs:
Topology DB id=0 (default)
Requestor—MPID3
Last Request: 1—no earlier request
Request: #2—second request
Flags:
   S=1—SN IE included—so give all LSAs
   T=1—transmit
   R=1 Request
Step (f) MP3 responds to the DB request with list of LSAs
Routing IE+3 topology IE (1, 2, 3) with Topology LSDB
Step (g) MP 2 requests the DB from MP3 with
DB Request: #2
Topology DB id=0
Requestor: MPID2
Last Request (1), Current Request (2)
Flags:
   T=1—transmit
   R=1—request
SN IE—Start with LSA4, end with LSA4
   (g-2) Ack IE: DB#0, last-req(2), ack(1-3)
Steps (h) MP2 responds with the list of LSA in a topology message (LSDB)

FIG. 11 illustrates, by way of non-limiting example, multiple nodes interacting to update each link state Databases. Mesh Point 1, 2, 3 and 4 interact to bring the database up.

Embodiments of this invention allows a database update based on a full or a partial list of LSA sequence numbers. For the database transmission, the Database Request message determines the side that will transmit the database. If the requests come in simultaneously, the tie breaking goes to the lowest Mesh Point Node Id (MAC address).

In embodiments of the invention, the MAC address grouping ID provides scalable MAC address that may be added or deleted in large groups. MAC addressees may be added or delete from the large Group Id.

A Radio-Aware Light Weight Routing Protocol ("ra-hello")

Embodiments of this invention include a "ra-Hello" protocol that can provide 1-hop to 2-hop connectivity in a wireless mesh network based on inclusion of fields in the Beacon message for wireless. Such embodiments include TLVs that can be used in the Beacon message, rules for interacting with the Beacon, and hello process rules (inbound and outbound.)

This ra-hello protocol provides a quick start topology knowledge that can stabilize a network while the wireless mesh routing protocols exchange databases. FIG. 12 shows the TLVs that can be supported in as part of the "ra-hello".

Most of these TLVs are also used on the TLVs passed in the extensions to the Link State update. The new TLVs are as follows:

Hello timers—a Type-length-value that includes: Hello interval time and dead router interval time.

Traffic engineering metric—contains a constraint map that indicates the use of the node weight and link weight.

The RA hello can be carried in 802.11 Beacon, Probe responses and mesh reports. The implied information in the frame is the neighbor (from the source MAC address) and the time stamp. The minimal set of information is the Wi-mesh protocol field. Other fields that may be included in the routing IE include:

Neighbor IE:
   MPID of Neighbor's Neighbor, routing-aware metric, topology-aware metric, MLID
   Routing Capability—bit per routing IE fields
   Forwarding IE (in embodiments, default unicast and/or power may be supported)
   Traffic Engineering IE (optional)
   Hello timers
   Unicast MAC IE (optional)
   Multicast MAC IE (optional, none)
Additional traffic engineering information
   Environmental IE-
   QoS IE—impacts links & nodes
   Resource IE parameters
      AS & Captive portal weighted per node
      Resource functions may impact node or link calculations
   Environmental IE
      Impact node and link based
   Power IE Embodiments of the invention include the following method for processing inbound ra-hello messages:

1. Process Beacon headers & sanity check routing information. If illegal, drop packet.
2. Process the security sections of the Routing header to see if MD5 hash is present.
   If so, compare the MD5 hash field with the calculated MD5. If no match, drop packet.
3. If encrypted, decrypt the packet.
4. Get packet, and reset dead link timer. Process Hello information for neighbor as adjacency information, but flag with current security level (none, MD5, or encrypted)
5. If security association needs to be established or changed, go through security association process. If secure association fails, drop the Mesh Link that this hello came in on. If secure association is valid, set the adjacency to secure.
6. Start the topology update request process (by requesting database update) & processing update information Embodiments of the invention include the following method for processing out-bound RA hello messages:

1. Upon initializing, discover the links that are valid
2. Determine the security parameters for each link & configured neighbors such as MD5 authentication, AS priority, RSN IE information, PMK (Announce, MIC or Shared key)
3. Schedule sending first hello with beacon information based on beacon set-ups
4. Upon receiving 1st neighbors hello, go through hello process
   a. If there is data received from WSTA, keep trying to establish
   b. If no data, back-off the hello interval.

Figure 13:
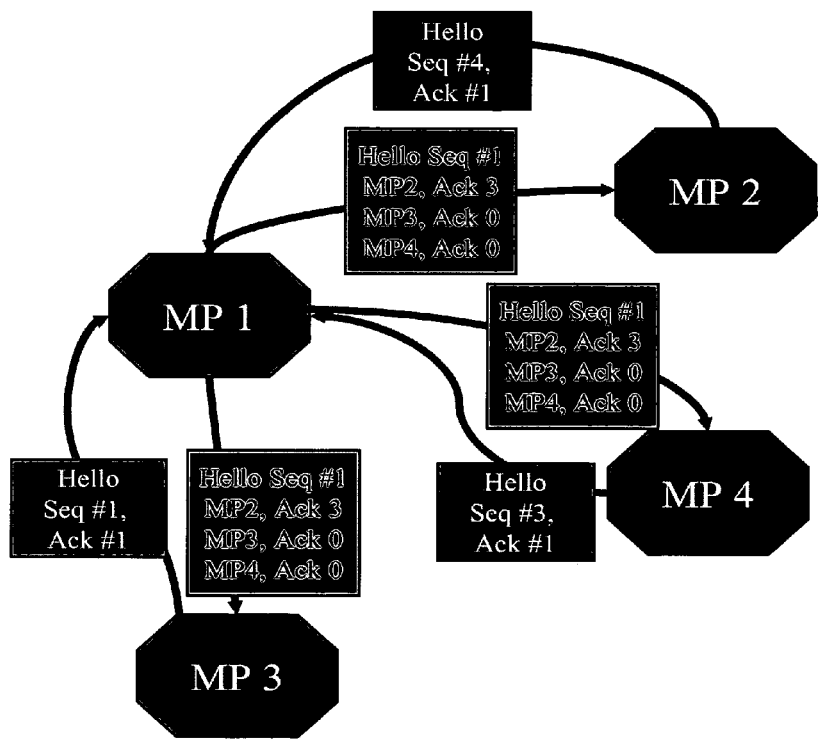
FIG. 13 illustrates an example of the transmission of acknowledgement messages in a wireless mesh network, in accordance with embodiments of the invention.

FIG. 13 provides an overview of a multi-node use of the "ACK" field in the hello message. The hello TLVs are sent with a sequence number. This sequence number is echoed in the neighbor's hello in the neighbor information. The ACK list in the Link State database also gives the sequence number for the last received hello.

This sequence number allows updates based on hello message information to be tracked in the exchanges. Thus if the database is out of date because it hasn't processed link state updates or hello updates, it will be reflected in the hello message. This check allows quick debugging of slowed processing due to CPU or memory overloads.

On-Demand Secure Multicast Path Set-Up Supported by Routing

Embodiments of the invention support on-demand group keys based on a MAC address or group of MAC address via additions to the flag for passing Group MAC addresses to indicate that:

Flag1: On-demand group key for these MAC addresses are to be obtain from the security process (either as a pre-shared key) or as a result from an 802.1x exchange with the appropriate authentication service, Flag 2: On-demand node group key has been obtain for this MAC address, and Flag 3: A flag that group encryption and forwarding has been established for this node.

These flags are carried as part of the Group MAC address with the "flag" world per group address.

If Flag 1 is on, the Mesh Point will, in embodiments of the invention, insert "hints" into an Expanded RSN IE (denoted here as an M-RSN IE) via 802.11i to initiate the 802.1x authentication. If flag 1 goes off, then the mesh point no longer needs the on-demand group key.

If flag 2 is on, the link state topology update mechanisms or the ra-hello topology mechanism, can start to calculate a path between all nodes transmitting to a Group address or listening to a group MAC data stream. Flag 3, indicates that the path calculations has completed at this time.

An additional embodiment of this invention enables the securing of multicast keys to a Group leader per multicast group (elected by a combination of Policy and Mesh Point ID). In some such embodiments, the multicast key group leader is located with good connectivity to an Authentication server.

CONCLUSION

The embodiments and examples provided herein are for example purposes only. Many alternatives, variants, and equivalents shall be readily apparent to those skilled in the art.

The invention claimed is:

1. A computer network system comprising:
   a plurality of communications nodes in communication via a plurality of wireless channels;
   in the plurality of communications nodes, one or more hybrid communications nodes in communication with a wide area network via one or more fixed-wire channels;
   a plurality of type-level-value parameters exchanged amongst the plurality of communications nodes via a plurality of network packets, each of the network packets including
      a first type-level-value parameter indicating a network routing protocol to be used by the plurality of network packets,
      a second parameter indicating a node from the plurality of communications nodes that originated the network packet,
      one or more parameters indicating an amount of power available at the originating node,
      one or more packets identifying a communications node that is linked directly to the originating node via one or more of a wireless channel from the plurality of wireless channels and a fixed-wire channel from the plurality of fixed wire channels,
      one or more packets indicating one or more nodes that neighbor the neighboring node;
   wherein each of the communications node is operative to receive the plurality of network packets, read the type-level-value parameters contained therein, and update a database of network paths for communication with the plurality of communications nodes by implementing the routing protocol in response to the type-level-value parameters.

2. The computer network system of claim 1, wherein the plurality of wireless channels include one or more IEEE 802.11 links.

3. The computer network system of claim 1, wherein the plurality of wireless channels include one or more IEEE 802.16 links.

4. The computer network system of claim 1, wherein the one or more fixed-wire channels include one or more IEEE 802.3 links.

5. The computer network system of claim 1, wherein the network routing protocol is a link state protocol.

6. The computer network system of claim 5, wherein the link state protocol is Open Shortest Path First (OSPF).

7. The computer network system of claim 1, wherein the network routing protocol is a link state path vector protocol.

8. The computer network system of claim 1, wherein the originating node is a mobile device, and the plurality of type level value parameters include a current battery life of the originating node.

* * * * *